(12) United States Patent
Cheethirala et al.

(10) Patent No.: US 8,775,580 B2
(45) Date of Patent: Jul. 8, 2014

(54) HARD ZONING ON NPIV PROXY/NPV DEVICES

(75) Inventors: Madhava Rao Cheethirala, Sunnyvale, CA (US); Subrata Banerjee, Los Altos, CA (US); Raja Rao Tadimeti, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 669 days.

(21) Appl. No.: 12/507,624

(22) Filed: Jul. 22, 2009

(65) Prior Publication Data

US 2011/0022693 A1    Jan. 27, 2011

(51) Int. Cl.
    *G06F 15/177*      (2006.01)

(52) U.S. Cl.
    USPC ........... 709/222; 709/220; 709/221; 709/223; 709/224; 370/389; 707/200; 711/108

(58) Field of Classification Search
    USPC .......... 709/222, 220, 221, 223, 224; 370/389; 707/200; 711/108
    See application file for complete search history.

(56) References Cited

U.S. PATENT DOCUMENTS

| | | | |
|---|---|---|---|
| 6,980,525 B2 * | 12/2005 | Banks et al. | 370/254 |
| 7,506,040 B1 * | 3/2009 | Rabe et al. | 709/223 |
| 7,523,233 B1 * | 4/2009 | Klein et al. | 710/62 |
| 2005/0076113 A1 * | 4/2005 | Klotz et al. | 709/224 |
| 2006/0112399 A1 * | 5/2006 | Lessly | 719/318 |
| 2007/0038679 A1 * | 2/2007 | Ramkumar et al. | 707/200 |
| 2007/0083625 A1 * | 4/2007 | Chamdani et al. | 709/223 |
| 2007/0192558 A1 * | 8/2007 | Honda et al. | 711/165 |
| 2008/0095152 A1 * | 4/2008 | George et al. | 370/389 |
| 2008/0247405 A1 * | 10/2008 | O'Leary et al. | 370/401 |
| 2009/0037977 A1 * | 2/2009 | Gai et al. | 726/1 |
| 2009/0164630 A1 * | 6/2009 | Hirata et al. | 709/225 |
| 2010/0082895 A1 * | 4/2010 | Branscome et al. | 711/108 |
| 2010/0306348 A1 * | 12/2010 | Dieberger et al. | 709/220 |

\* cited by examiner

*Primary Examiner* — Ario Etienne
*Assistant Examiner* — Michael C Lai
(74) *Attorney, Agent, or Firm* — Patterson & Sheridan LLP

(57) ABSTRACT

Techniques are disclosed for zoning information to be shared with an NPIV proxy device or an NPV device such as a blade switch in a blade chassis. Doing so allows the NPV device to enforce zoning locally for the attached server blades and virtualized systems. The NPV device may learn zoning rules using Fiber Channel name server queries and registered state change notifications. Additionally, the NPV device may snoop name server queries to retrieve zoning information (or state change messages) without using the zoning change protocols and without consuming a Fiber Channel domain from the Fiber Channel fabric.

8 Claims, 4 Drawing Sheets

HARD ZONING ON NPIV PROXY/NPV DEVICES

TECHNICAL FIELD

This disclosure relates generally to computer servers and data center networks.

BACKGROUND

Modern data centers are frequently built using Fibre Channel fabrics to provide secure, reliable, and scalable computing power. A Fibre Channel fabric may use interconnected Fibre Channel switches to connect hundreds (if not thousands or more) computer systems in a data center to a storage area network (SAN). Each switch in a Fibre Channel fabric consumes an available Fibre Channel (FC) domain value, and the Fibre Channel standard has a physical limit of 239 domains (and a practical limit of even smaller number of domains). This limits the maximum number of FC switches in a FC fabric.

At the same time, blade chassis have become a popular technique to increase the density in the number of computer systems present in a given rack. Currently, e.g., blade chassis are available that provide 128 distinct physical computing systems within the confines of a single rack enclosure. Further, with the use of system virtualization, the number of distinct computing systems per rack can go even higher. Blade servers are frequently configured with a "blade switch," which provides a switching device, such as a Fibre Channel switch. The blade switch connects the servers within the blade chassis to external switches in the Fibre Channel fabric of a data center. However, each blade switch typically consumes one of the limited domains in the FC fabric, which can lead to the exhaustion of FC domains. Accordingly, as the number of edge switches grows, managing the use of FC domain IDs becomes an important concern.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1:
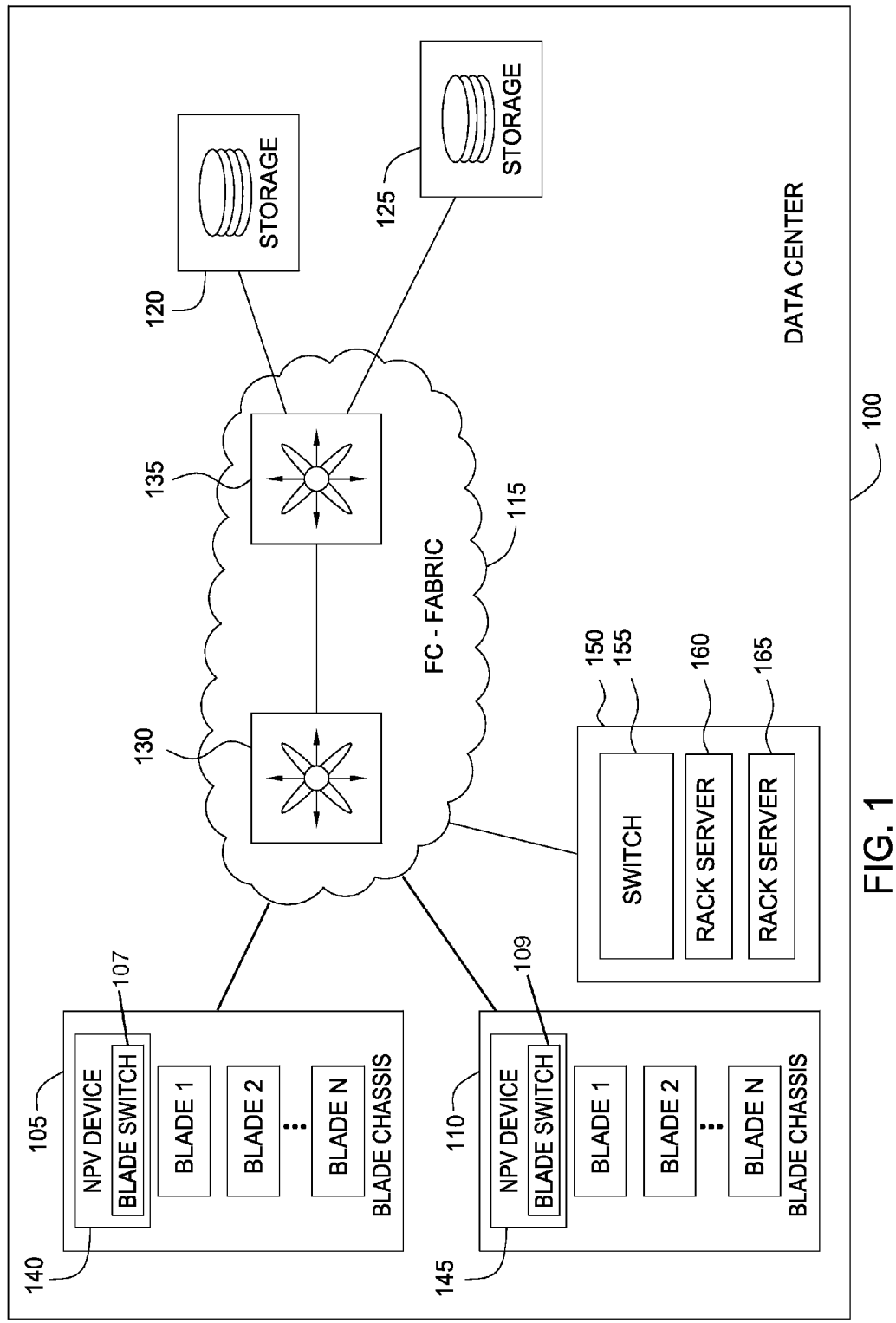
FIG. 1 is a block diagram illustrating an example of components in a data center, according to one embodiment.

N_port ID Virtualization (NPIV) provides a mechanism for sharing a single physical n_port among multiple n_port IDs. Doing so allows multiple initiators, each with its own n_port ID, to share the n_port. N_port virtualization (NPV) reduces the number of Fibre Channel domain IDs in SANs. Switches operating in the NPV mode do not join a fabric; rather, they pass traffic between NPV core switch links and end devices, eliminating the domain IDs for these edge switches. Thus, NPV addresses the increase in the number of domain IDs needed to deploy a large number of the ports by making a fabric or module switch appear as a host to the core Fibre Channel switch, and as a Fibre Channel switch to the servers in the fabric or blade switch. However, because a switch operating in NPV mode does not join the fabric, it is left to the upstream FC switch to enforce zoning.

Embodiments described in this disclosure provide techniques for hard zoning on n_port ID virtualization (NPIV) proxy devices or n_port virtualizer (NPV) devices. One embodiment of the disclosure includes a switching device having a processor and a memory. The memory may store a program configured to perform an operation to enforce zoning restrictions between communicating devices. The operation itself may generally include receiving, from an endpoint device connected to the switching device, a request to join a network fabric, issuing a name server query to the network fabric to obtain a current zone set for the endpoint device, programming one or more zoning rules on the switching device to restrict traffic to/from the endpoint device based on the current zone set. That is, the switching device may be configured to drop one or more frames addressed to/from the endpoint device based on the programmed zoning rules.

In a particular embodiment, the switching device virtualizes a node port in a Fibre Channel fabric for a plurality of endpoint devices connected to the switching device, without consuming a Fibre Channel domain from the Fibre Channel fabric. For example, the switching device may provide a blade switch in a blade chassis. In such a case, the endpoint device may be a blade server and/or a virtualized computing system executing on the blade server. The zoning rules themselves may be programmed into the switching device using one or more ternary content addressable memory TCAM modules present in the switching device (or any other hardware/software modules present in the switching device. Further, the switching device may update the programmed zoning rules for the endpoint device in response to receiving a state change notification.

DESCRIPTION OF EXAMPLE EMBODIMENTS

Embodiments described herein provide techniques for enforcing hard zoning in a Fibre Channel network. One such embodiment described herein provides techniques for hard zoning on n_port ID virtualization (NPIV) proxy devices or n_port virtualizer (NPV) devices. As noted above, the rapid growth in popularity of blade chassis systems configured with a blade-switching device (e.g., a Fibre Channel (FC) switch) is pressing the physical limit of FC domain IDs. A number of devices are available to help address the domain ID challenge resulting from this increased use of blade chassis systems. These products avoid the use of an FC domain ID in the blade switch by configuring such blade switches to join an FC fabric as an n_port ID virtualization (NPIV) enabled device.

NPIV allows a Fibre Channel host connection (or n_port) to be assigned multiple n_port IDs or Fibre Channel IDs (FCIDs) over a single physical link. For example, an NPIV-enabled host bus adapter (HBA) allows multiple virtualized systems to each obtain a distinct n_port ID while sharing a common host bus adapter.

Similarly, aggregation devices such as an N-Port Virtualizer (NPV) allow the blade switch or device to behave as an NPIV-based host bus adapter (HBA) to a core Fibre Channel director for the blades in the blade chassis. The NPV device aggregates the locally connected host ports or n_ports into one or more uplinks. That is, the NPV device allows each distinct computing system in the blade chassis (whether physical or virtualized) to obtain a distinct n_port ID and appear to the fabric as though it were connected to the core switch directly using the virtualized n_port provided by the NPV device. Thus, an NPV device allows an edge switch, such as a blade switch in a blade chassis, to behave as an HBA to the core FC switch, reducing the number of FC domains required in large blade chassis/blade server deployments. At the same time, the NPV device operates as a Fibre Channel switch relative to the systems in the blade chassis.

While an NPV device addresses the need to conserve FC domain IDs, particularly in large deployments of blade chassis and blade server systems, the lack of a domain ID prevents the NPV device from participating in Fibre Channel zoning. More specifically, implementing Fibre Channel zoning requires the knowledge of a current active zone-set in the fabric, but zone-set data is distributed only to the participating switches in the fabric.

The current Fibre Channel standard provides for both "soft zoning" and "hard zoning." Soft zoning refers to software-based zoning; that is, zoning enforced through control-plane software on Fibre Channel switches in the Fibre Channel Name Server service. Hard zoning refers to hardware-based zoning, enforced through hardware access control lists ACLs which are applied to every Fibre Channel frame that is switched over an interface on a given device. While soft zoning provides sufficient security to prevent accidental loss of data, it does not provide sufficient security to prevent unauthorized access to data. Hard zoning does provide the additional security necessary to prevent unauthorized access to data, but only when no worldwide name (WWN) spoofing is used. Because hard zoning is based on hardware, it is more secure that soft zoning. Participating in the hard zoning protocol requires a Fibre Channel domain. Since the NPV devices do not consume a domain and are not visible as switches in the fabric, they cannot participate in the hard zoning.

As NPV devices do not enforce zoning, FC access switches may be configured to do so for any such connected NPV devices, in much the same manner an FC switch enforces zoning for an NPIV capable host bus adapter. However, this may require FC access switches to have significantly more hardware resources (e.g., TCAM modules) to support hard zoning for all the NPV connected devices, particularly in large blade chassis and blade server deployments. At the same time, existing hardware resources on NPV devices are not used effectively. This occurs as NPV devices are typically FC capable switches that operate as an NPV device in order to conserve the number of available FC domain IDs.

Thus, embodiments described herein allow zoning information to be shared with an NPIV proxy device or an NPV device such as a blade switch in a blade chassis. Doing so allows the NPV device to enforce zoning locally for the attached server blades. In one embodiment, an NPV device learns zoning rules using Fibre Channel name server queries and registered state change notifications. For example, when a new device (e.g., a server blade or virtual system running on the blade server) logs into an FC fabric, the NPV device may provide a NPIV n-port ID for the new device.

Further, the NPV device may query a FC name server to obtain a list of what other devices in the FC fabric the new device may communicate. That is, when a device logs in through the NPV device, the NPV device knows the device ID (the n_port ID) of the device logging-in, and may query an FC name server using that device ID to identify what other devices the new device can talk to. Using this information, the NPV device may program zoning rules in hardware on the NPV device to enforce zoning locally (e.g., using a set TCAM rules). For any changes later on, the NPV device may register to receive state change notifications. The fabric may issue a state change notification, e.g., when certain device configuration changes occur, when a device leaves the fabric, or when a new device joins the fabric. When such a change occurs, the NPV device may query the name server for the latest zone-set information and update the hardware on the NPV device accordingly. Thus, as described, NPV devices may implement hard zoning by programming the hardware resources in NPV device, allowing resources on the upstream switch(es) to be used for other tasks and not requiring large hardware scale-ups, all without actually participating in the zoning protocol performed by the core switches in the FC fabric.

More generally, a blade-switching device (e.g., an NPV switch) may snoop name server queries to retrieve zoning information without using the zoning change protocols. Further, the blade-switching device may update zoning information by keeping track of RSCN messages. Given that hard zoning enforcement is dependent on the existing name server protocol; this approach allows the NPV switch to enforce zoning, without requiring a new protocol between the core switch and the blade switch.

This disclosure references various embodiments. However, it should be understood that this disclosure is not limited to embodiments described herein. Instead, any combination of the following features and elements, whether related to different embodiments or not, is contemplated to implement and practice an embodiment. Furthermore, in various embodiments, embodiments provide numerous advantages over the prior art. However, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim One embodiment disclosed herein provides an NPV device configured to enforce zoning for a number of computing systems attached to the NPV device (e.g., multiple blade servers in a blade chassis enclosure). In such a case, the NPV device may provide access to the FC fabric for the server blades, without consuming an FC domain from the overall FC fabric. However, one of ordinary skill in the art will recognize that embodiments are not limited to Fibre Channel fabrics or NPIV aware HBAs or NPV switching devices and the embodiments may be adapted for use with a variety of networking topologies, protocols, architectures and/or systems.

Additionally, application programs disclosed herein may be distributed on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks.

FIG. 1 is a block diagram illustrating an example of components in a data center 100, according to one embodiment. As shown, the data center 100 includes a blade chassis 105 and a blade chassis 110. Blade chassis 105 includes blades (labeled as blade 1, 2 and N), an NPV device 140, and a blade switch 107. Similarly, blade chassis 110 includes blades (labeled as blade 1, 2 and N), an NPV device 145 and a blade switch 109. Blade chassis 105, 110 are included to be representative of a variety of different available blade chassis and blade server architectures. Accordingly, each blade server may include a processor(s), a memory, and other circuitry used to connect each blade to the blade chassis 105, 110. The blade chassis 105, 110 may also be configured to provide cooling, power, and networking interconnects to link each blade 1, 2, N, to the NPV device 140, 145. Further, in this example, blade switches 107 and 109 are used to connect the blade chassis 105, 110 to an FC fabric 115, respectively. That is, the blade switches 107 and 109 each provide a switching device used to connect the blades 1, 2, and N to an FC fabric 115 and to route network traffic to the server blades housed by the blade chassis 105 and 110. The data center 100 also includes a rack 150 housing multiple rack servers (160 and 165). Illustratively, a top-of-rack switching device 155 connects each individual rack servers 160, 165 to the FC fabric 115. Switching device 155 may also connect the rack servers 160, 165 to other networks (e.g., an L2 Ethernet). Further, although shown separately for clarity, the blade chassis 105, 110 may be disposed within a server rack housing, each chassis taking up some nU units of space in the rack. In such a case, the blade switches 107, 109, connect the blade chassis to a top of rack switching device.

As shown, the FC fabric 115 itself includes an FC switch 130 and an FC switch 135. In this example, the FC switch 130 is connected to the blade chassis 105, 110 and FC switch 135. Further, the FC switch 135 is connected to storage systems 120, 125 (e.g., a collection of disk drives connected to an FC storage controller). Thus, in this example, the data center 110 provides a simplified example of a SAN implemented using an FC fabric connecting computing resource (blade servers present in the blade chassis 105, 110) with physical storage systems (storage devices 120, 125).

Figure 2:
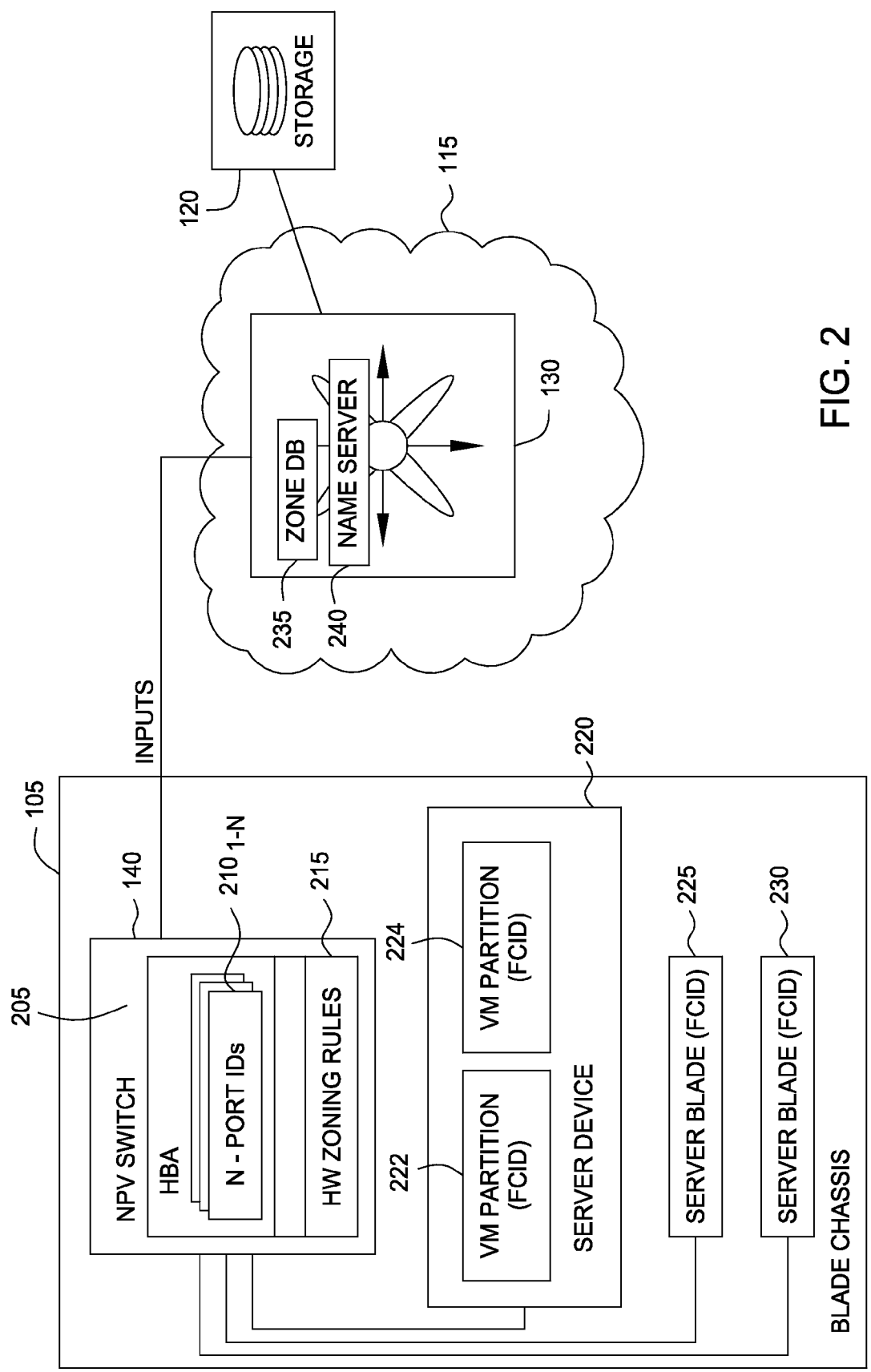
FIG. 2 illustrates an example of a server infrastructure that includes an NPV device within a data center, according to one embodiment.

FIG. 2 further illustrates the example blade chassis 105 of FIG. 1 connected to an FC fabric 115 using a blade switch, according to one embodiment. As shown, the blade chassis 105 includes NPV device 140, which connects blade servers 220, 225 and 230 to the FC fabric 115. Storage device 120 is also connected to the FC fabric 115.

The NPV device 140 includes a host bus adapter (HBA) 205. The HBA adapter allows the NPV device 140 to virtualize an uplink to FC switch 130 by providing and managing an n_port ID 210 to each device within the blade server 105. An n_port commonly refers to a port that connects a node (e.g., a host bus adapter on a computing system) to a Fibre Channel fabric. As shown, the NPV device assigns and manages an n_port ID $210_{1-N}$ to each of the server blades 220, 225 and 230. Further, server blade 220 is shown to include two VM partitions 222, 224. Partitions 222, 224 each represent a virtualized computing system assigned an n_port ID 210 by the NPV device 140. In this example, the NPV device 140 allows each computing system in the blade chassis 105 (physical or virtualized) to appear as though it were connected to the FC fabric 115 using a distinct n_port connection. Such connections share the common uplink connecting NPV device 140 to the FC switch 130. Thus, as shown, the NPV device 140 is connected to an f_port of the switch 130. An f_port commonly refers to a port on a fiber channel switch that connects a node to a Fibre Channel fabric. That is, the n_port of a device is typically connected to an f_port of a switch.

The NPV device 140 also includes a set of hardware zoning rules 215. In one embodiment, the hardware zoning rules 215 may be configured to filter frames to/from the devices attached to the NPV device (e.g., the server blades 220, 225 and 230 and the virtual machine partitions 222 and 224). The zoning rules may be programmed using TCAM modules on the NPV device 140. In one embodiment, the NPV device may issue a fabric name server query in order to identify a set of devices in the fabric which one of the server blades 230 (or VM partitions) may communicate with.

Accordingly, as shown, the FC switch 130 includes a zone database 235 and a name server 240. The zone DB 235 stores a set of zones. Each zone may specify what devices is part of a given zone. The devices within a zone may communicate with other devices in that zone. Additionally the name server 240 allows a device to identify what devices are members of a given of a zone. For example, the NPV device 140 may query the name server 240 (e.g., using GID_FT/GNN_FT/GPN_FT, etc.) as if the NPV device 140 were one of the underlying server blades. That is, NPV device 140 may query the name server 240 using the n_port ID assigned to the underlying server blade (or VM partition). In response, the NPV device 140 receives a list of devices with which the underlying server blade (or VM partition) is allowed to communicate. This list contains the currently active devices based on the current active zone set. The name server 240 may be configured to enforce soft zoning on the name server queries issued by the NPV device 140. That is, the query results are filtered to remove the names of devices in the FC fabric 115 that are not part of the same zone as the device issuing the name server query (as identified by the n_port ID or FCID included in the name server query). From the results of the name server query, NPV device 140 may generate one or more hardware zoning rules 215 and program these entries into the hardware of the NPV switch 140 (e.g., using a set of TCAM modules).

Further, the NPV device 140 may identify changes to the zoning configuration and update the hardware zoning rules accordingly. For example, in one embodiment, the NPV 140 device may register for (and receive) registered state change notifications (RSCN) from the FC fabric 115. RSCN provides a Fibre Channel fabric's notification sent to a set of nodes in case of any major fabric changes such as nodes joining or leaving the fabric, switches joining or leaving the fabric, or a change in the active zoneset. RSCN notifications allow the NPV device 140 to immediately learn about changes to the FC fabric 115 and react accordingly.

In one embodiment, the NPV device 140 may be configured to manage and map the OX_IDs used by the underlying blade server to a well-known address of the name server 240. An OX_ID generally refers to Originator Exchange Identifier in an FC fabric. The OX_ID is 2-byte field in the frame header used by the originator of an exchange to identify frames as being part of a particular Exchange. Typically, the blade servers (or VM partitions) perform name server queries after logging on to the FC fabric 115. Alternatively, the NPV device 140, may observe queries made by the servers logging on to the FC fabric 115 and use that information to program hardware zoning rules 215. This way, the NPV device 140 does not have to manage OX_IDs. Instead, the NPV device 140 observes name server queries issued by the underlying servers and creates/updates the hardware zoning rules 215 accordingly.

Thus, the NPV device 140 may perform two distinct types of name server interactions. In a "snooping" interaction, the NPV device 140 does not initiate any new exchanges on its own and rather depends/snoops on underlying devices' queries. Thus, in "snooping" interactions, the NPV device 10 does not need to manage OX_IDs. Conversely, in "non-snooping" interactions the NPV device 140 may be configured to initiate independent name server queries. Thus, in the "non-snooping" interactions, the NPV device 140 has to make sure that the OXIDs used do not conflict with ones used by device for communication with any other name server queries.

In one embodiment, the NPV device 140 may register to receive RSCNs on behalf of the device (acting as a proxy). In such a case, the NPV device 140 may be configured to ensure that the RSCNs are terminated at the NPV device 140. That is, when the NPV device 140 registers to receive RSCNs, the notifications received pursuant to such a notification are not forwarded to the underlying servers.

Figure 3:
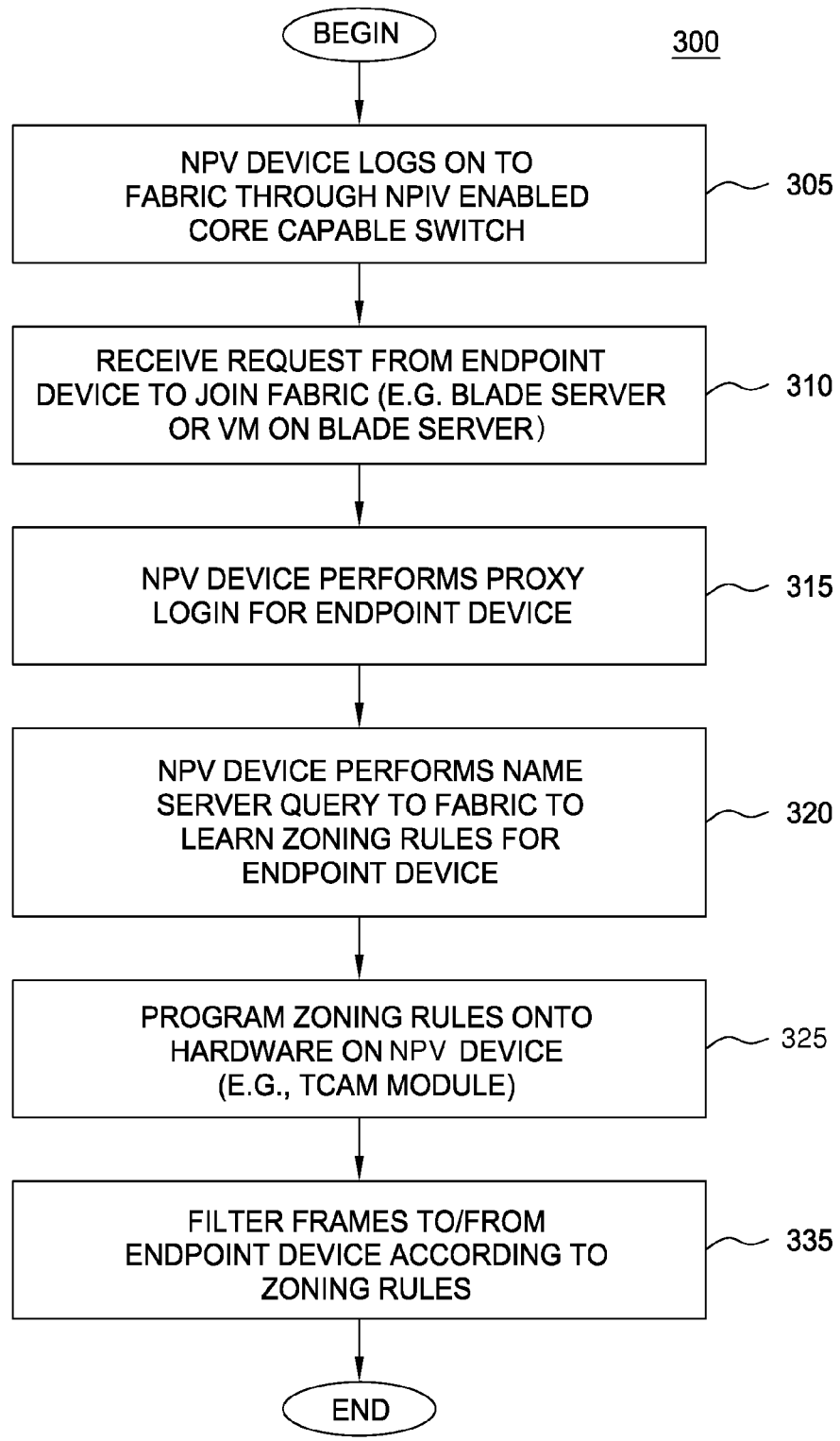
FIG. 3 illustrates a method for an NPIV proxy/NPV device to enforce hard zoning rules, according to one embodiment.

FIG. 3 illustrates a method for an NPIV proxy/NPV device to enforce hard zoning rules, according to one embodiment. As shown, the method 300 begins at step 305 where the NPV switch logs on the to the FC fabric. For example, the NPV device may be connected to an NPIV switch core capable switch as a blade switch for a blade chassis. Further, the NPV device may be configured to virtualize the n_port connection between itself and the core switch to multiple underlying devices, such as a number of server blades (or virtual systems running on the server blades).

At step 310, the NPV switch receives a request from an end point device (e.g., one of the underlying server blades) to join the FC fabric. In response, at step 315, the NPV switch performs a proxy login for the endpoint device and assigns an N-Port ID to the device being logged onto the FC fabric. At step 320, the NPV switch may perform a name server query to the FC fabric to learn what zone set the device logged on at step 315 belongs to. At step 325, after receiving a response from the name server query, the NPV switch programs zoning rules in hardware on the NPV switch (e.g., using programmable TCAM modules).

Thereafter at step 335, the NPV switch may filter frames to/from the endpoint device according to the zoning rules. For example, if the device logged on to the fabric sends a frame with a destination address that is not part of the active zone set for that sending device, then the NPV switch simply drops that frame. Similarly, if a frame received by the NPV switch is addressed from a device that is not part of the zone of an endpoint device (e.g., one of the server blades of VM partitions) the NPV switch simply drops the frame. Thus, learning zoning information from the name server queries allows the NPV switch to learn about the current active zone set using existing standard based name server generic services queries and enforce hard zoning in the NPV switch itself, leading to a scalable solution.

Figure 4:
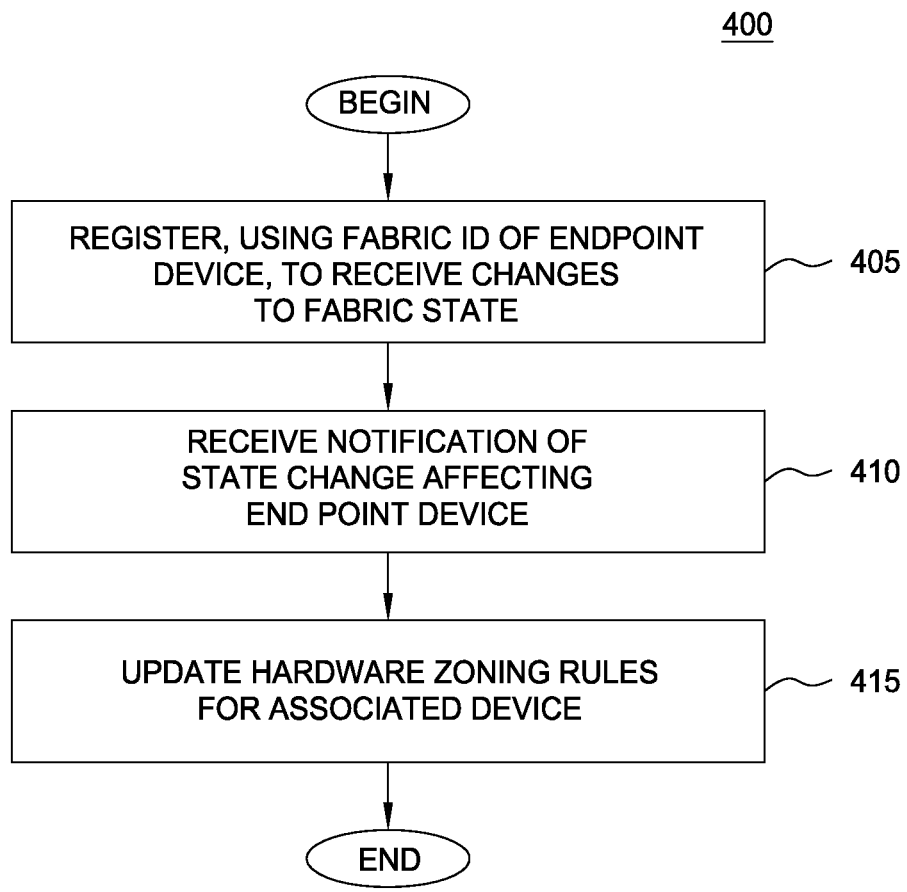
FIG. 4 illustrates a method for an NPIV proxy/NPV device to update hard zoning sets for a set of Fibre Channel devices in a blade chassis, according to one embodiment.

Further, as described above, the NPV switch may also be configured to respond to changes in the FC fabric (or zoning rules) that affect the underlying server systems (e.g., server blades or virtualized systems) attached to the NPV switch. For example, FIG. 4 illustrates a method 400 for an NPIV proxy/NPV device to update hard zoning sets for a set of Fibre Channel devices in a blade chassis, according to one embodiment. As shown, the method 400 begins at step 405, where the NPV switch sends a state change registration (SCR) request to the Fabric Controller (e.g., a core switch) to add a specified n_port to a list of registered ports to receive Registered State Change Notifications (RSCN). As noted above, changes such as nodes joining or leaving the fabric, switches joining or leaving the fabric, or a change in the name of an FC switch, etc., may be changes that result in an RSCN message being sent to nodes of the FC fabric. The NPV switch registers to receive RSCN messages on behalf of an underlying node, typically one of the server blades (or virtualized systems) connected to the NPV switch as part of the blade chassis. Note, as the NPV switch may virtualize an n_port for multiple underlying systems in the blade server, the NPV switch may register to receive state change notification for multiple n_port IDs.

At step 410, after a configuration change occurs, the NPV switch receives a notification of a state change for one of the registered n_ports. Typically, devices connected to the NPV switch are Initiators (e.g., blade servers) and register for RSCNs. In such cases, the NPV switch may observe the RSCN messages sent to a device registered to receive such messages. In cases where a given end point device does not register to receive RSCN messages (e.g., because the device is a target is connected to NPV switch), the NPV switch can register for RSCNs on behalf of the connected devices and terminate the notifications sent to NPV switch for the devices it proxies. Alternatively, the NPV switch can periodically query the name server on the core switch to see if any changes have occurred. In addition, the NPV switch can query name server for all connected devices, if any one of the device receives RSCN update. In another case, the NPV switch can tap the name server queries made by the connected device to learn about any changes to the FC fabric.

At step 415, the NPV switch updates the zoning rules programmed in the hardware of the NPV switch for the device identified in the RSCN message. For example, the RSCN message may be addressed to one of the n_port IDs virtualized by the NPV switch. In such a case, the NPV switch may issue a name server query to obtain any changes in the zone set associated with that n_port ID and update the zoning rules programmed in the hardware of the NPV switch accordingly. As described, the NPV switch registers as a proxy for the underlying end point node. In an alternative embodiment, the NPV switch simply monitors and observes RSCN messages sent to/from the endpoint devices directly.

Advantageously, embodiments described herein allow zoning information to be shared with an NPIV proxy device or an NPV device such as a blade switch in a blade chassis. Doing so allows the NPV device to enforce zoning locally for the attached server blades. That is, embodiments described in this disclosure provide techniques for an NPV device to enforce hard zoning for a collection of connected nodes (e.g., blade servers and/or virtualized systems) without having to join the FC fabric as a switch (and thereby consume an FC domain). Further, embodiments described above learn about the current active zone set based on name server generic services queries and enforce hard zoning in the NPV switch itself leading to more scalable solution. Thus, embodiments described above free core fabric switch resources from being used to implement hard zoning, resulting in scalable data center architectures and network topologies that use high-density blade chassis.

While the foregoing is directed to embodiments of the present disclosure, other and further embodiments of the disclosure may be devised without departing from the basic scope thereof, and the scope thereof is determined by the claims that follow.

The invention claimed is:

1. A method, comprising:
 receiving, from a first endpoint device of a plurality of endpoint devices connected to a switching device, a request to join a network fabric, wherein the switching device virtualizes a port ID for each of the plurality of endpoint devices and wherein the switching device does not consume a domain ID within the network fabric, wherein the switching device virtualizes a connection to the network fabric for the plurality of endpoint devices and performs hardware based zoning without joining the network fabric, wherein the switching device is an N_port virtualization switch in a blade chassis, and wherein the blade chassis is configured to connect the switching device to a Fibre Channel fabric;

issuing a name server query to the network fabric to obtain a current zone set for the first endpoint device;

receiving a response to the name server query;

programming one or more zoning rules into one or more hardware modules on the switching device to restrict traffic to/from the first endpoint device based on the zone set obtained in response to the name server query, wherein the programmed zoning rules enforce zoning restrictions between communicating devices in the network fabric; and in response to receiving a state change notification, updating the programmed zoning rules for the first endpoint device.

2. The method of claim 1, further comprising: registering, on behalf of the first endpoint device, to receive state change notifications from the network fabric.

3. The method of claim 1, further comprising:

observing the first endpoint device registering to receive state change notifications; and subsequently, snooping a network state change notification message addressed to the first endpoint device to receive the state change notifications.

4. The method of claim 1, further comprising: dropping one or more frames addressed to/from the first endpoint device based on the programmed zoning rules.

5. An apparatus, comprising:

a switching device including a memory comprising instructions for execution by processors, wherein the switching device virtualizes a connection to a network fabric for a plurality of endpoint devices and performs hardware based zoning without joining the network fabric, wherein the switching device is an N_port virtualization switch in a blade chassis, and wherein the blade chassis is configured to connect the switching device to a Fibre Channel fabric; and one or more processors coupled to the memory, the one or more processors when executing the instructions being configured to:

receive, from a first endpoint device of the plurality of endpoint devices connected to the switching device, a request to join the network fabric, wherein the switching device virtualizes a port ID for each of the plurality of endpoint devices and wherein the switching device does not consume a domain ID within the network fabric;

issue a name server query to the network fabric to obtain a current zone set for the first endpoint device;

program one or more zoning rules on the switching device to restrict traffic to/from the first endpoint device based on the current zone set; and in response to receiving a state change notification, update the programmed zoning rules for the first endpoint device.

6. The apparatus of claim 5, wherein the one or more processors, when executing the instructions, are further configured to:

observe the first endpoint device registering to receive state change notifications, and subsequently snoop a network frame addressed to the first endpoint device to receive the state change notification.

7. The apparatus of claim 5, wherein the one or more processors, when executing the instructions, are further configured to drop one or more frames addressed to/from the first endpoint device based on the programmed zoning rules.

8. The apparatus of claim 5, wherein the programmed zoning rules are programmed into the switching device using one or more ternary content addressable memory (TCAM) modules present in the switching device.

* * * * *